US007995034B2

(12) United States Patent
Pope et al.

(10) Patent No.: US 7,995,034 B2
(45) Date of Patent: Aug. 9, 2011

(54) INPUT DEVICE HAVING A PRESENCE SENSOR

(75) Inventors: Jeremiah Pope, Kirkland, WA (US);
Chun Beng Goh, Redmond, WA (US);
James Marshall, Puyallup, WA (US);
Brad Fosdick, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 11/474,119

(22) Filed: Jun. 22, 2006

(65) Prior Publication Data

US 2007/0296701 A1    Dec. 27, 2007

(51) Int. Cl.
*G06F 3/033* (2006.01)
*G06F 3/02* (2006.01)
*G06F 1/26* (2006.01)

(52) U.S. Cl. .................. 345/163; 345/168; 713/320

(58) Field of Classification Search ........ 345/163–166, 345/168–169, 211; 713/320
See application file for complete search history.

(56) References Cited

U.S. PATENT DOCUMENTS

| | | | |
|---|---|---|---|
| 5,854,621 A * | 12/1998 | Junod et al. .................. 345/158 |
| 6,661,410 B2 | 12/2003 | Casebolt et al. |
| 6,703,599 B1 * | 3/2004 | Casebolt et al. .............. 250/221 |
| 6,773,128 B2 * | 8/2004 | Katrinecz et al. ............... 362/84 |
| 6,859,196 B2 | 2/2005 | Kehlstadt |
| 7,236,154 B1 * | 6/2007 | Kerr et al. ..................... 345/102 |
| 2002/0095222 A1 * | 7/2002 | Lignoul ........................ 700/13 |
| 2004/0192413 A1 * | 9/2004 | Frank ............................ 455/574 |
| 2005/0201291 A1 * | 9/2005 | Gluck .......................... 370/241 |
| 2006/0035590 A1 * | 2/2006 | Morris et al. ................. 455/41.2 |

OTHER PUBLICATIONS

Revision E of Application Note, Cypress Semiconductor Corporation, entitled "Capacitive Front Panel Display Demonstration" dated Oct. 20, 2005 (7 pages).
Internal Correspondence at Cypress Semiconductor Corporation dated Nov. 28, 2005, between Chris Hammer and Steve Berry, Subject: How to set CSR Parameters (14 pages).

* cited by examiner

*Primary Examiner* — Lun-Yi Lao
*Assistant Examiner* — Jarurat Suteerawongsa
(74) *Attorney, Agent, or Firm* — Merchant & Gould P.C.

(57) ABSTRACT

A system and method for reducing power consumption of a wireless input device is disclosed. The input device may convert between a high power state and a low power state. In the high power state, a transmitter and light sources are activated, whereas both the transmitter and the light sources are deactivated in the low power state. Following a period of inactivity in which neither a key sensor for activatable keys nor a presence sensor for the user transmit input, the input device may convert from the high power state to the low power state to conserve energy. When the presence sensor detects the presence of the user, however, the input converts to the high power state wherein the transmitter and the light sources are activated.

13 Claims, 8 Drawing Sheets

INPUT DEVICE HAVING A PRESENCE SENSOR

BACKGROUND

A variety of data entry techniques have been developed to enhance usability and to make computers more versatile. A typical computing environment, especially a computing environment incorporating graphical user interfaces for user interaction, may be optimized for accepting input from one or more discrete input devices. As an example, an individual may enter characters (i.e., text, numerals, and symbols) with a keyboard and control the position of a pointer image on a display with a pointing device, such as a mouse or trackball. A computing environment incorporating graphical user interfaces may also accept input though one or more natural input methods, including speech input methods and handwriting input methods. With regard to speech input methods, the phonemes of speech are input with a microphone and analyzed to convert the speech to typewritten text. With handwriting input methods, a pen-like stylus may be utilized to serve the general purpose of a pointing device and create electronic ink, which is analyzed to convert the handwriting into typewritten text.

Wireless connections are utilized in some input devices, particularly keyboards and pointing devices, to transmit data from the input devices to a computer. A variety of conventional wireless technologies may be utilized to transmit data from the input devices to a computer, including infrared, radio frequency, and BLUETOOTH technologies, for example. Whereas conventional wired input devices utilize a power/data cord to transmit data and supply power, wireless input devices rely upon battery power sources that are periodically replaced or recharged. In order to increase the intervals between replacing or recharging battery power sources, wireless input devices may employ power management states to conserve energy.

Wireless input devices are often turned on for ready usability but left idle for significant periods of time. This presents an opportunity to reduce depletion of battery power through the use of power management states that conserve energy by disabling various power-consuming functions associated with the input devices. As an example, a wireless input device may have a high power state wherein data is continuously transmitted to a computer, and the wireless input device may have a low power state wherein the transmission of data is disabled. During periods where the input device is utilized to enter characters or move a pointer, for example, the input device will remain in the high power state. After a predetermined period of inactivity, however, the input device may switch to the lower power state (i.e., cease transmitting data) to conserve energy. Once the wireless input device detects user interaction, the input device may switch back to the high power state and reestablish the connection with the computer. As another example, optical pointing devices that utilize a light source may switch from a high power state, wherein the light source is illuminated, to a low power state, wherein the light source is not illuminated, after a predetermined period of activity to conserve energy. A potential drawback to utilizing power management states is that a delay may occur between a time when the input device detects interaction and then switches to the high power state. That is, a time period may be required for the input device to switch from the low power state to the high power state.

SUMMARY

An example of the invention is an input device having a housing, a plurality of activatable controls, a light source, a sensor, and a control device. The housing forms at least a portion of an exterior of the input device. The controls are accessible from the exterior of the input device. The light source is at least partially located within the housing to illuminate the activatable controls. The sensor detects a presence of a user, and the sensor is separate from the controls and at least partially located within the housing. In addition, the control device is coupled to the light source and the sensor, and the control device activates the light source upon detecting the presence of the user.

Another example of the invention is a wireless keyboard having a housing, a plurality of activatable controls, a first sensor system, a transmitter, and a second sensor system. The housing forms at least a portion of an exterior of the keyboard, and the housing defines (a) a forward edge positioned proximal a user during use of the keyboard, (b) a rearward edge positioned away from the user during use of the keyboard, and (c) a pair of side edges extending between the forward edge and the rearward edge. The activatable keys are depressible toward an interior of the housing, and the keys are accessible from the exterior of the keyboard. The first sensor system has at least one first sensor that detects activation of the keys. The transmitter transmits data associated with the activation of the keys. In addition, the second sensor system has at least one second sensor that detects a presence of a user. The at least one second sensor is located within the housing and proximal the forward edge, and the at least one second sensor is separate from the at least one first sensor.

Yet another example of the invention is a method including a step of determining a time delay for establishing a data connection between a wireless input device and a computer. A presence of a user proximal the wireless input device is detected. In addition, an intensity of a light source is increased during a time period substantially equal to the time delay.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

Aspects of the invention are illustrated by way of example and not limited in the accompanying figures in which like reference numerals indicate similar elements and in which.

DETAILED DESCRIPTION

Introduction

The following discussion and accompanying figures relate to input devices that incorporate a sensor for detecting a presence of a user. As discussed in the Background section above, wireless connections are utilized in some input devices to transmit data from the input devices to a computer, and the input devices utilize battery power sources that periodically require replacement or recharging. In order to reduce depletion of the battery power sources, power management states are utilized to conserve energy by disabling various power-consuming functions associated with the input devices. One disadvantage in the use of power management states relates to time delays. More particularly, a delay occurs between the time when the input device detects user interaction and the time when the connection with the computer is reestablished. As discussed in greater detail below, input devices may decrease the time delay by positioning sensors at locations that detect the presence of the user at a relatively early time, or input devices may incorporate light sources that provide feedback to the user regarding the connection between the input device and the computer.

Exemplary Computing System Environment

Figure 1:
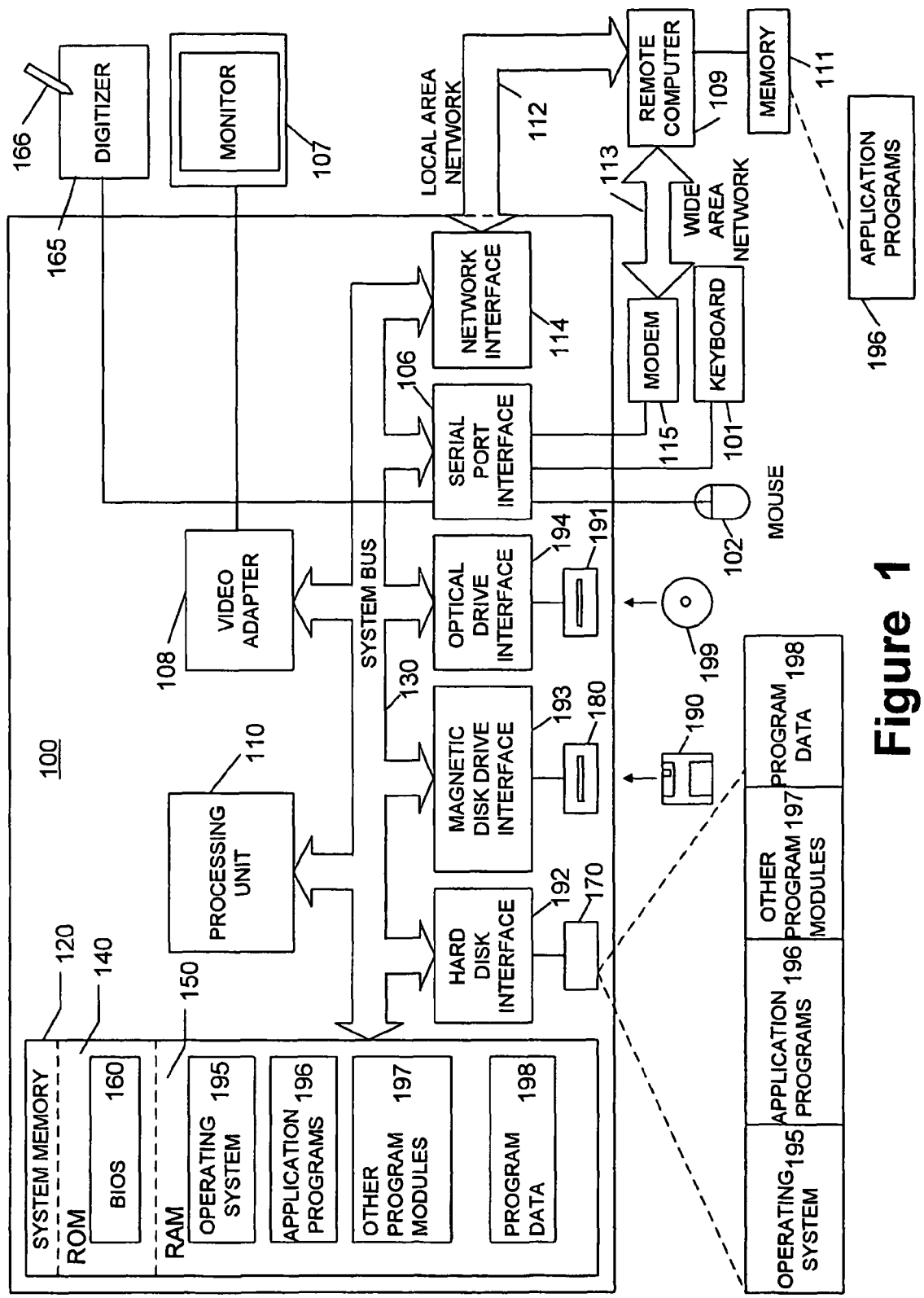
FIG. 1 is a schematic view of an exemplary computing system environment.

FIG. 1 illustrates a schematic diagram of a general-purpose digital computing environment that can be used to implement various aspects of the invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, the magnetic disk drive 180, and the optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, the magnetic disk 190, the optical disk 199, the ROM 140, or the RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick device, game pad, satellite dish, scanner, or the like. These and other input devices are often connected to the processing unit 110 through a serial port interface 106 that is coupled to the system bus 130, but they also may be connected by other interfaces, such as a parallel port, game port, BLUETOOTH or other wireless connections, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an illustrative environment, it will be understood that other computing environments also may be used. For example, one or more examples of the invention may use an environment having fewer than all of the various aspects shown in FIG. 1 and described above, and these aspects may appear in various combinations and subcombinations that will be apparent to one of ordinary skill.

Input Device Structure

Figure 2:
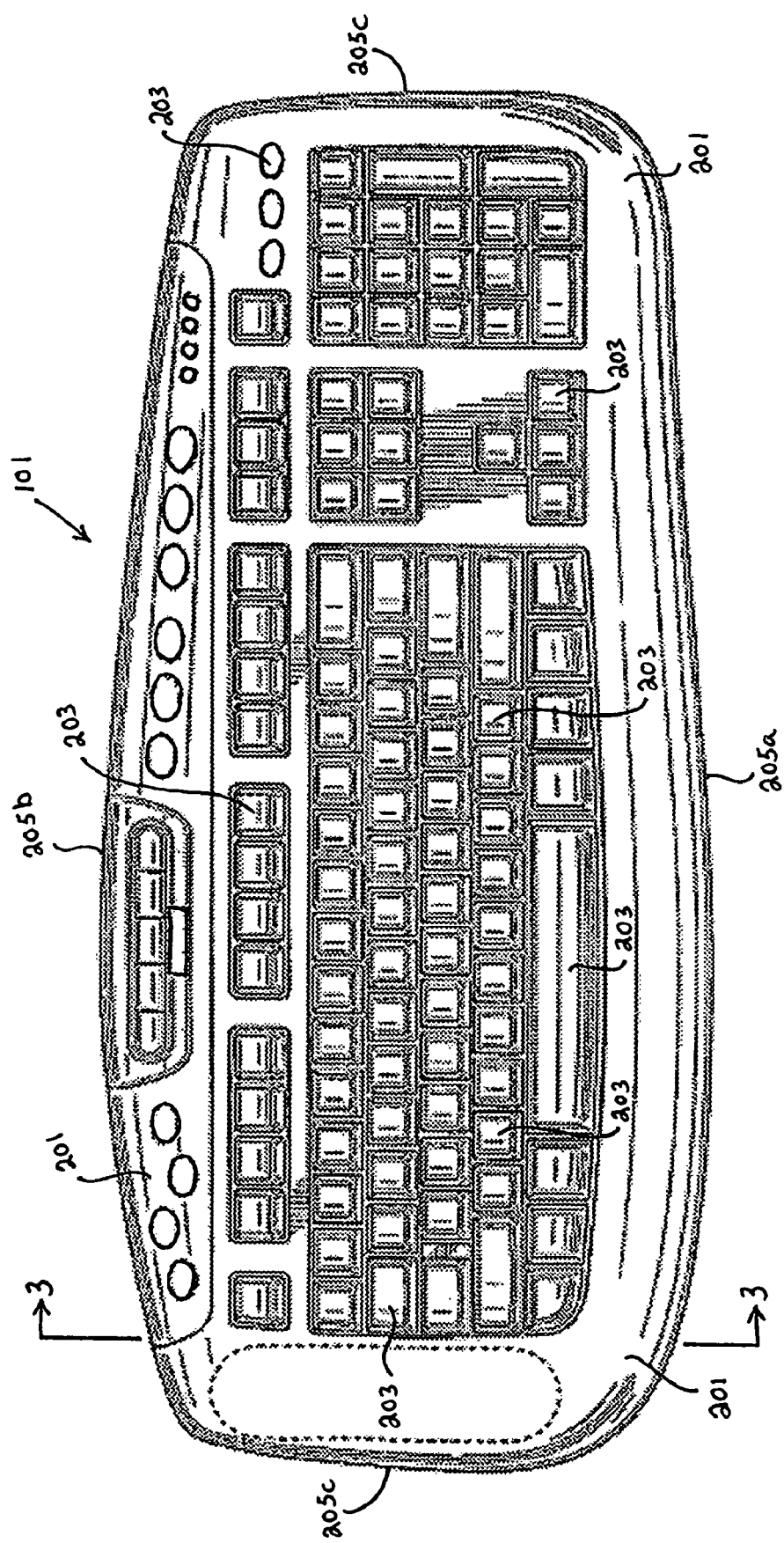
FIG. 2 is top plan view of a keyboard.

With reference to FIG. 2, the keyboard 101 is depicted individually as having a housing 201 and a plurality of activatable keys 203 that are accessible from an exterior of the keyboard 101. As is well-known in the art, one purpose of the keyboard 101 is to selectively enter data, which generally takes the form of a plurality of characters, such as alphabetic characters, numerals, punctuation marks, or one of the various symbols that are commonly utilized in written text (e.g., $, #, %, &, or @). In addition, the keyboard 101 may perform various functions, such as executing software applications, controlling power states in the computer 100, or controlling the position of a pointer or cursor, for example. By depressing or otherwise activating the various keys 203, the user may enter characters or perform the various functions.

The housing 201 defines various edges that include a forward edge 205a, a rearward edge 205b, and a pair of opposite side edges 205c. Although the keyboard 101 may be oriented in a variety of ways relative the user, conventionally the forward edge 205a is positioned proximal the user during use of the keyboard 101 and the rearward edge 205b is positioned away from the user during use of the keyboard 101. In addition, the side edges 205c extend between the forward edge 205a and the rearward edge 205b.

Figure 3:
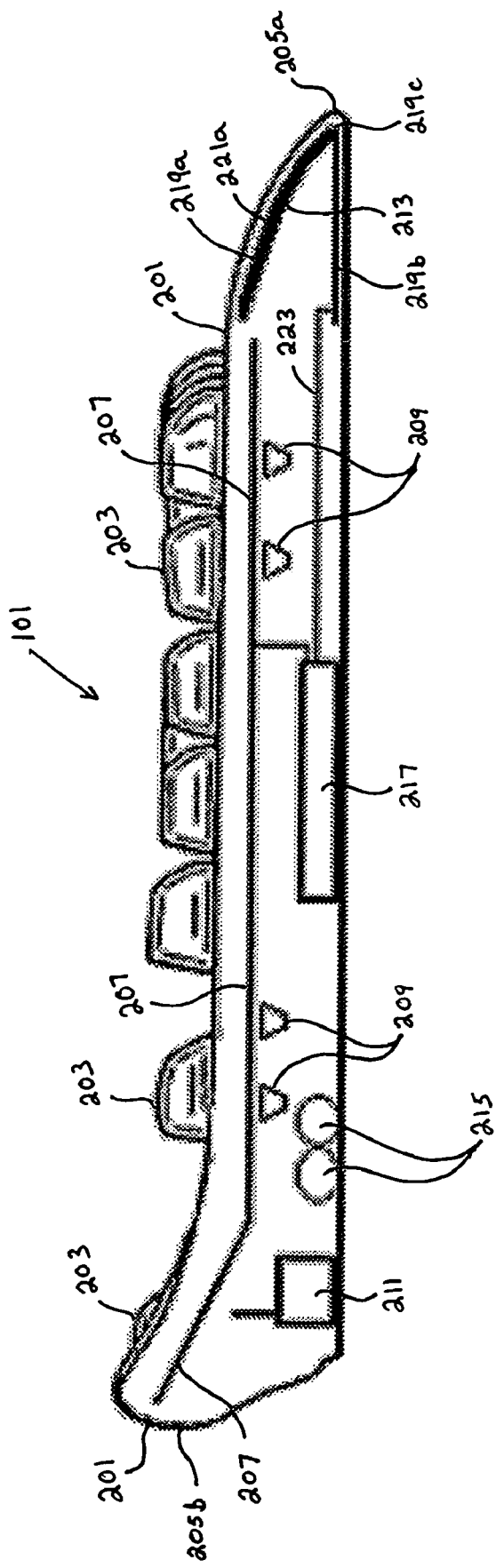
FIG. 3 is a schematic cross-sectional view of the keyboard, as defined by section line 3-3 in FIG. 2.

The housing 201 encloses various components that include a key sensor 207, various light sources 209, a transceiver 211, a presence sensor 213, a power source 215, and a microprocessor 217, as depicted schematically in the cross-section of FIG. 3. In addition to these components, the housing 201 may also enclose other elements, including a pointing device (e.g., touchpad or trackball assembly) for moving a pointer on the monitor 107, a mechanical system for modifying the orientation of the keyboard 101 relative to the user, and an activation (i.e., on/off) switch for the keyboard 101. Accordingly, the keyboard 101 may include a variety of relatively conventional elements not specifically discussed herein.

Key sensor 207 extends under each of the keys 203 and detects activations of the various keys 203. More particularly, when the keys 203 are depressed or otherwise activated, the key sensor 207 detects the actuations and transmits a corresponding signal to microprocessor 217. The key sensor 207 may have the configuration of a conventional membrane sensor system, as disclosed in U.S. Pat. No. 6,323,445 to Yee. Alternately, the key sensor 207 may have the configuration of a capacitive sensor that detects activations of the various keys 203, or other suitable sensor systems may be employed.

The light sources 209 are located under the keys 203 and provide backlighting that illuminates the keys 203. When utilizing the keyboard 101 in a darkened environment, light sources 209 permit the user to visually-distinguish the various keys 203 from each other and also determine the characters or functions associated with the keys 203. As an example, the keys 203 may be at least partially transparent such that illumination from the light sources 209 passes through the keys 203 and permits the user to see the character or function identifiers associated with the keys 203. Although the light sources 209 are depicted as being positioned below the key sensor 207, the light sources 209 may also be located between the keys 203 and the key sensor 207. In addition to illuminating the keys 203, the light sources 203 may provide visual queues as to whether various functions are activated, such as CAPS LOCK, SCROLL LOCK, and NUMBER LOCK, for example, or the light sources 203 may indicate whether the keyboard 101 is turned on or otherwise active. In some configurations of the keyboard 101, the light sources 209 may be omitted or utilized for other functions. In further configurations, the degree to which the light sources 209 illuminate may be related to the amount of light around the keyboard 101, as detected by the presence sensor 213 or another sensor.

The transceiver 211 has a generally conventional configuration that wirelessly transmits data to the computer 100 and may also receive data from the computer 100. For example, when one of the keys 203 is activated, the transceiver 211 wirelessly sends a corresponding signal to the computer 100 indicating that a particular character should be entered or that a particular function should be performed. In some configurations of the keyboard 101, a conventional cord-style connection that carries both power and data may replace the transceiver 211. In some configurations, transceiver 211 may have the configuration of a transmitter, with a receiver being a separate component. In further configurations, the keyboard 101 may only include a transmitter.

The presence sensor 213 detects changes in the environment due to the presence of the user proximal to the keyboard 101. Accordingly, the presence sensor 213 may detect changes in the electric field, magnetic field, electromagnetic field (e.g., light), sound; and temperature, for example. As discussed in greater detail below, the keyboard 101 may employ various power management states that conserves energy in the power source 215. More particularly, the light sources 209 and the transceiver 211 may be deactivated after a period of inactivity to increase the length of time that the power source 215 may be utilized between recharging or replacement. When the presence sensor 213 detects movement of the user, the light sources 209 and the transceiver 211 may be activated to provide the user with illumination of the keys 203 and a connection between the keyboard 101 and the computer 100. Although the presence sensor 213 is depicted as being a separate sensor than the key sensor 207, the presence sensor 213 and the key sensor 207 may be a single sensor or sensor array in some configurations of the keyboard 101.

Figure 4:
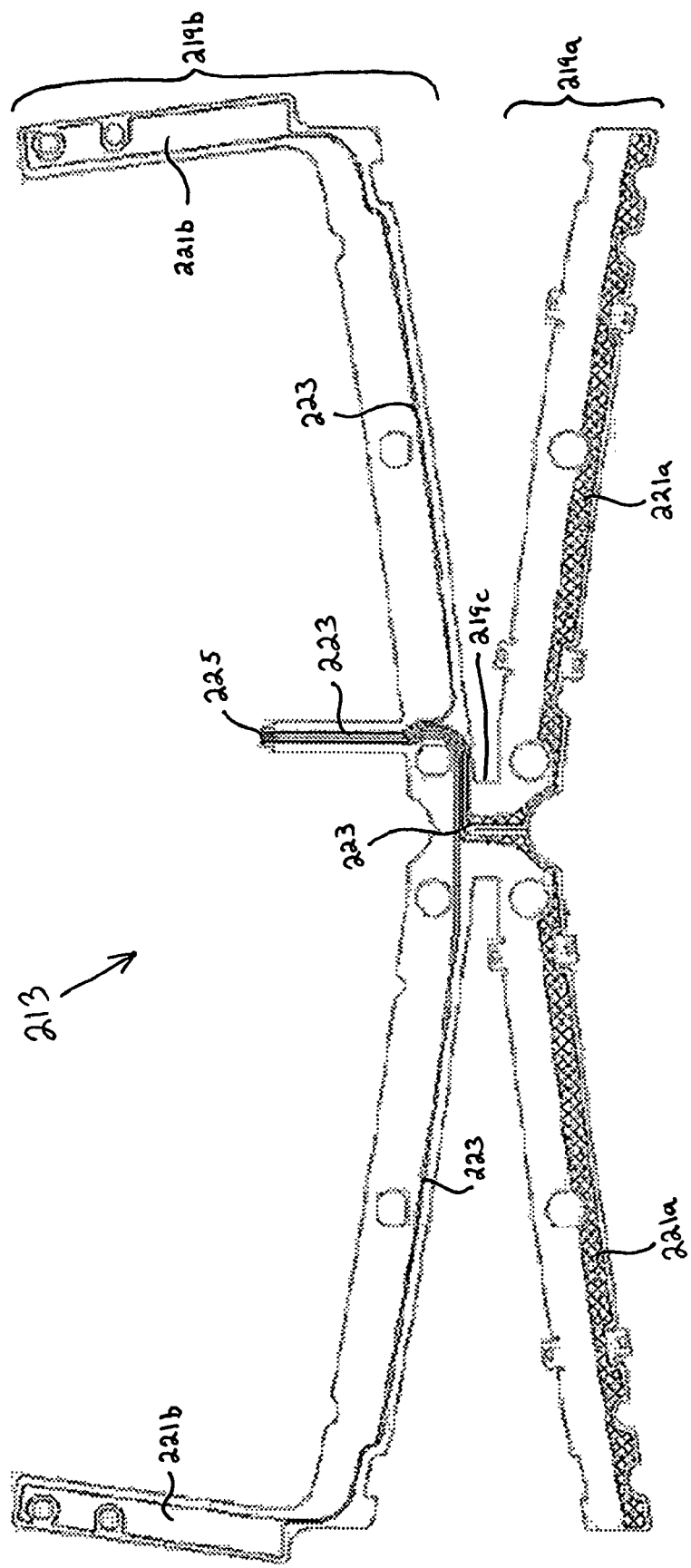
FIG. 4 is a top plan view of a sensor element of the keyboard.

With reference to FIG. 4, the presence sensor 213 is depicted as having a first portion 219a and a second portion 219b that are joined by a connecting portion 219c. First portion 219a includes a sensing region 221a, and second portion 219b includes a pair of sensing regions 221b. The presence sensor 213 may be formed from a film of polymer material that includes various conductive leads 223 extending from the sensing regions 221a and 221b to a connector 225, which electrically-connects the presence sensor 213 to the microprocessor 217. Accordingly, the sensing regions 221a and 221b transmit signals to the microprocessor 217 through the leads 223. The sensing regions 221a and 221b are capacitive sensors that may detect the presence of the user without physical contact between the user and the keyboard 101. Although the range of the sensing regions 221a and 221b may vary significantly, the sensing regions 221a and 221b may detect when a portion of the user (e.g., the user's hand) is within four inches, for example, of the keyboard 101 through changes in capacitance. In addition to capacitive sensors, the sensing regions 221a and 221b may be infrared sensors, ultrasonic sensors, or acoustic sensors, for example. Accordingly, a variety of sensor types may be utilized for the presence sensor 213.

The presence sensor 213 is located within the housing 201 such that the sensing region 221a is proximal to the forward edge 205a and the sensing regions 221b are proximal to the side edges 205c. More particularly, the first portion 219a and the second portion 219b are folded relative to each other at the connecting portion 219c, as depicted in FIG. 3. This configuration locates the first portion 219a adjacent an upper area of the housing 201 and proximal to the forward edge 205a. In addition, the second portion 219b lays adjacent a lower area of the housing 201 such that portions including the sensing regions 221b extend rearward and along the side edges 205c. In general, therefore, the sensing regions 221a and 221b are respectively located adjacent the edges 205*a* and 205*c*, which form a portion of a periphery of the keyboard 101.

The power source 215 is located within the housing 201 and provides energy to each of the key sensor 207, the light sources 209, the transceiver 211, the presence sensor 213, and the microprocessor 217. The power source 215 may be either rechargeable batteries or replaceable, non-rechargeable batteries, for example. In configurations wherein a conventional cord-style connection that carries both power and data is utilized, the power source 215 may be absent from the keyboard 101.

Figure 5:
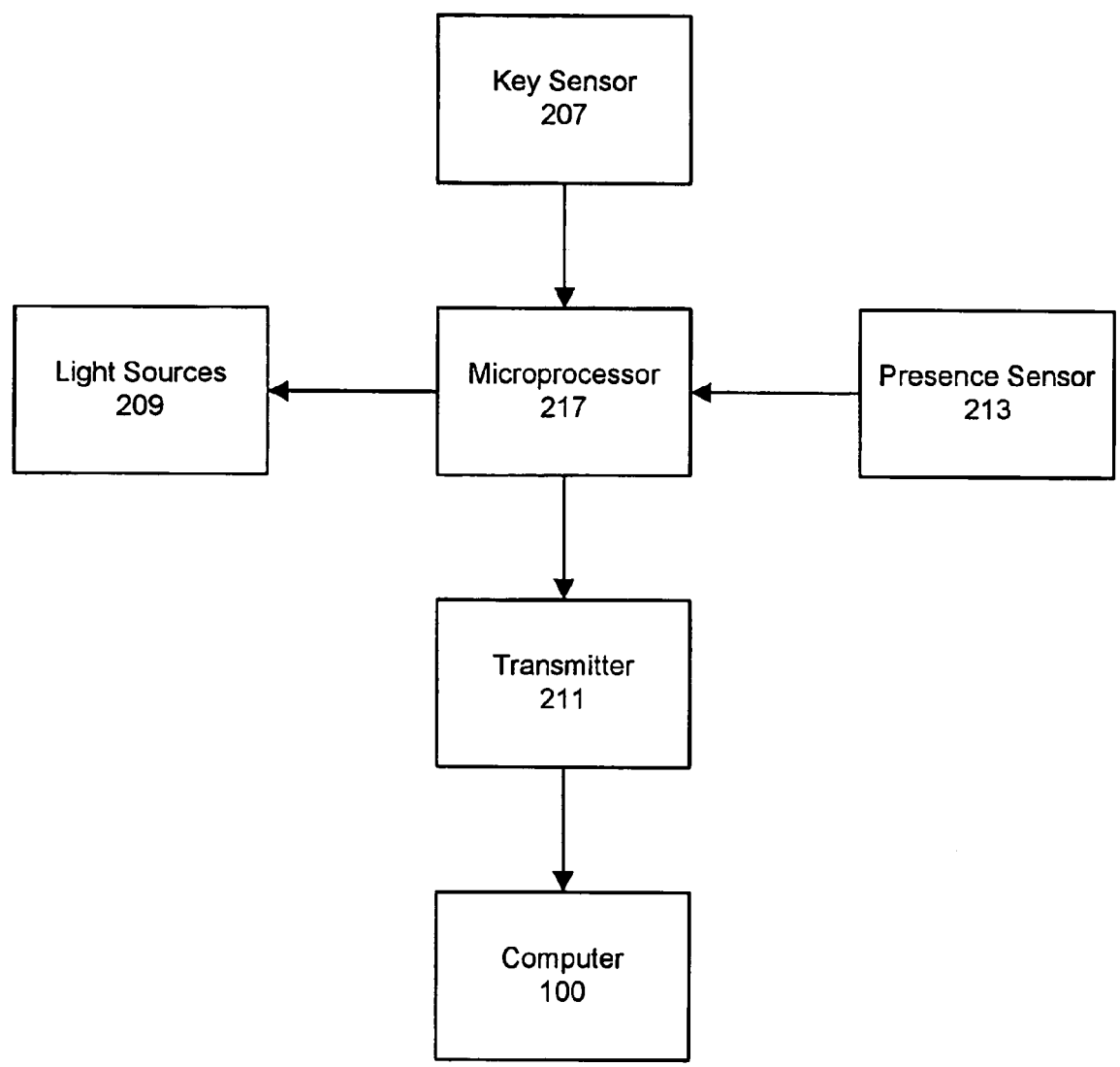
FIG. 5 is a schematic diagram of a system of the keyboard or another input device.

The microprocessor 217 effectively controls the operation of the keyboard 101. With reference to FIG. 5, the manner in which the keyboard 101 operates will be discussed in greater detail. In general, the microprocessor 217 receives input from both the key sensor 207 and the presence sensor 213, and the microprocessor 217 directs operation of the transceiver 211 and the light sources 209 based upon this input. In addition, the transceiver 211 is wirelessly connected to the computer 100 and transmits data to the computer 100 and may receive data from the computer 100.

Power Management States

The transceiver 211 and the light sources 209 require energy and may deplete the power source 215, thereby requiring that the power source 215 be replaced or recharged. In order to reduce depletion of the power source 215, power management states are utilized to conserve energy by disabling various power-consuming functions associated with the keyboard 101. For example, one or both of the transceiver 211 and the light sources 209 may be deactivated following a time period in which neither the key sensor 207 nor the presence sensor 213 provide input to the microprocessor 217. That is, after a period of inactivity by the user, the microprocessor 217 may (a) disable the wireless connection between the transceiver 211 and the computer 100 and (b) turn off the light sources 209 to conserve energy in the power source 215.

Based upon the above discussion, the keyboard 101 includes at least two power management states. When the keyboard 101 is in a high power state, both the transceiver 211 and the light sources 209 receive energy and are activated. When the keyboard 101 is in a low power state, however, neither the transceiver 211 nor the light sources 209 receive energy and are effectively deactivated. In addition to the high power state and the low power state, the keyboard 101 may have various intermediate power states wherein one of the transceiver 211 and the light sources 209 are activated, or the light sources 209 may be dimmed, for example.

As an example of the manner in which the keyboard 101 operates, assume that the keyboard 101 is in the high power state and both the transceiver 211 and the light sources 209 receive energy and are activated. This may occur immediately following activation of the keyboard 101 (e.g., by turning the keyboard 101 on) or while the user is typing on the keyboard 101. In the high power state, the transceiver 211 wirelessly connects the keyboard 101 to the computer 100 and the light sources 209 illuminate the keys 203. If the user activates one of the keys 203, the microprocessor 217 receives input from the key sensor 207 and directs the transceiver 211 to send data to the computer 100. As discussed above, the data may direct that various characters be entered or that various functions be performed, depending upon the specific keys 203 or combinations of keys 203 that are activated. Also, if the user activates one of the keys 203, the microprocessor 217 receives input from the presence sensor 213 based upon the proximity of the user (e.g., the user's hands) to the keyboard 101.

Following a period of inactivity wherein the microprocessor 217 does not receive input from either of the key sensor 207 and the presence sensor 213, the keyboard 101 may convert from the high power state to the low power state to conserve energy in the power source 215. More particularly, the microprocessor 217 may (a) disable the wireless connection between the transceiver 211 and the computer 100 and (b) turn off the light sources 209. As long as the microprocessor 217 does not receive input from either of the key sensor 207 and the presence sensor 213, the keyboard will remain in the low power state.

While in the low power state, if the microprocessor 217 receives input from either of the key sensor 207 and the presence sensor 213, then the microprocessor 217 activates both of the transceiver 211 and the light sources 209. Accordingly, the transceiver 211 will wirelessly connect with the computer 100 and the light sources 209 will illuminate. One disadvantage in the use of power management states relates to time delays. More particularly, a delay occurs between the time when the keyboard 101 detects user interaction and the time when the connection with the computer 100 is reestablished. When the user attempts to utilize the keyboard 101, the user's hands will generally move toward the keyboard 101 and will likely be detected by the presence sensor 213. The presence sensor 213 will, therefore, provide input to the microprocessor 217 indicating that the user is present before physical contact is made between the user and the keyboard 101. As noted above, the sensing regions 221*a* and 221*b* of the presence sensor 213 are respectively located adjacent the edges 205*a* and 205*c*, which form a portion of a periphery of the keyboard 101. The sensing regions 221*a* and 221*b* are positioned, therefore, to detect the presence of the user as the user's hands approach the keyboard 101. Accordingly, the time delay may be minimized by positioning sensing regions 221*a* and 221*b* at locations that detect the presence of the user at a relatively early time.

Upon detecting the presence of the user with the presence sensor 213, the microprocessor 217 activates both of the transceiver 211 and the light sources 209. Although the transceiver 211 may be activated, the wireless connection with the computer 100 may be delayed as the connection is reestablished. The light sources 209 may be utilized to provide feedback to the user regarding the state of the connection between the input device and the computer. Although the light sources may be immediately illuminated by the microprocessor 211, illumination may be delayed until the connection with the computer 100 is reestablished so that the user does not activate the keys 203 prior to establishment of the connection. As an alternative, the illumination from the light sources 209 may be gradually increased during the time delay so that full illumination of the light sources 209 coincides with establishment of the connection.

Once the transceiver 211 establishes a connection with the computer 100 and the light sources 209 are illuminated, the keyboard is returned to the high power state. The user may then activate the keys 203 to enter characters or perform functions. If a period of inactivity follows, however, the keyboard 101 may return to the low power state. Accordingly, the keyboard 101 changes between the high power state and the low power state depending upon whether input is received by the microprocessor 217 from the key sensor 207 and the presence sensor 213. In this manner, energy associated with the power source 215 may be conserved.

In addition to reducing time delays, the keyboard 101 may also assist the user in various darkened or low light environments. For example, the user may not be able to distinguish between individual keys 203. By moving a hand proximal to the keyboard 101, light sources 209 are illuminated to assist the user with seeing the keys 203. That is, the system discussed above for the keyboard 101 may be utilized to assist users in seeing the keys 203. before having to depress the keys 203 while typing or otherwise utilizing the keyboard 101.

Flow Diagram Discussion

Figure 6:
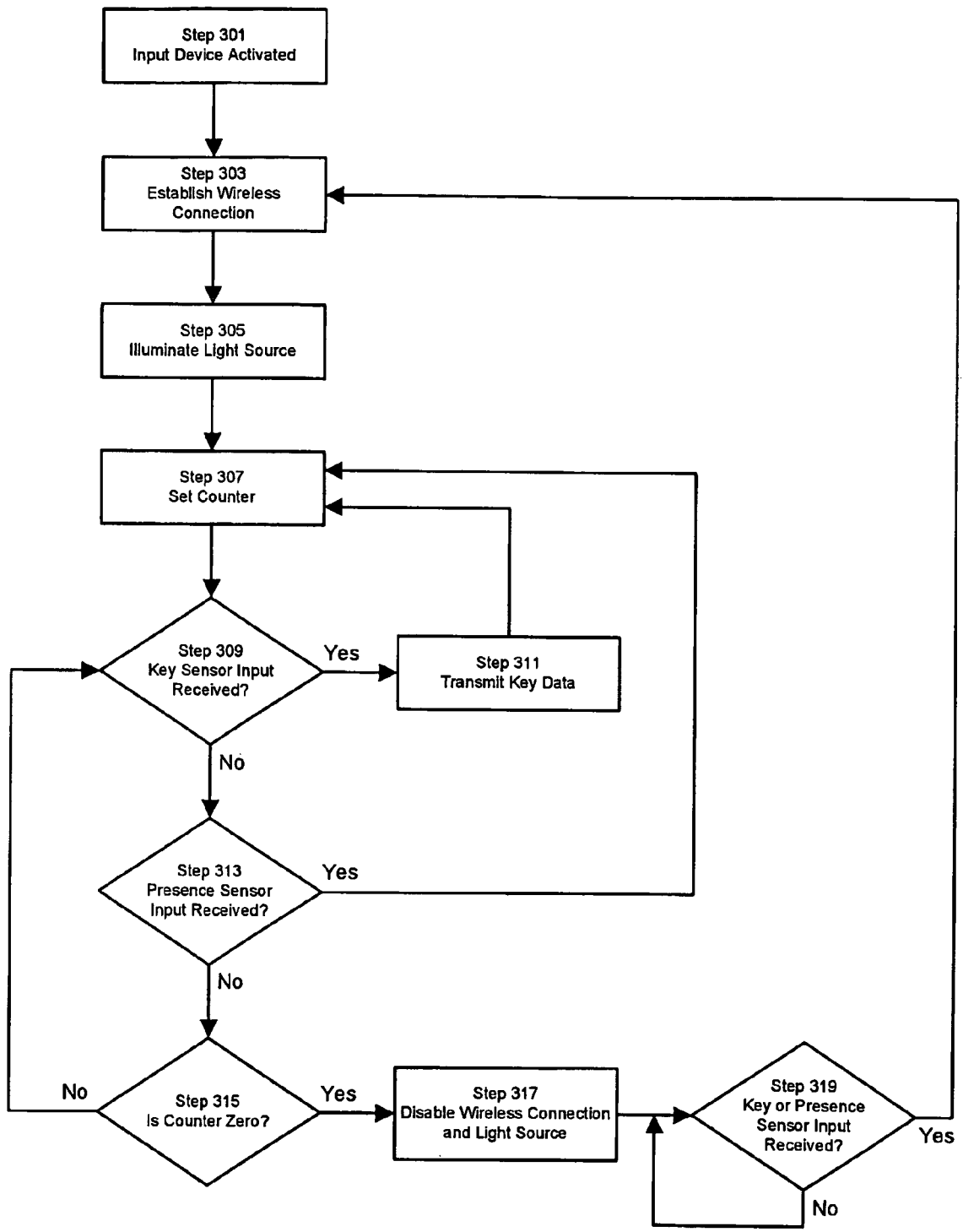
FIG. 6 is a flow diagram illustrating operation of the keyboard or another input device.

An enhanced understanding of the system discussed above may be gained through reference to FIG. 6, which discloses a flow diagram illustrating steps performed in executing various aspects of the invention. Initially, the keyboard 101 is activated (Step 301), which may occur when the keyboard 101 is turned on or when power source 215 is installed, for example. The wireless connection between the keyboard 101 and the computer 100 is then established (Step 303). Upon receiving power, the transceiver 211 sends a signal to the computer 100 that establishes the connection between the computer 100 and the keyboard 101, thereby permitting data from activating keys 203 to be transmitted to the computer 100. In addition to establishing the connection between the keyboard 101 and the computer 100, light sources 209 are illuminated (Step 305).

At this stage of the process, the keyboard 101 is in the high power state. Following a period of inactivity, however, the keyboard 101 converts to the low power state. The period of inactivity that precedes the conversion from the high power state to the low power state may be predetermined or set by the user. A counter is set, however, to the period of inactivity (Step 307) and begins counting down. If input is received from the key sensor 207 (Step 309), then data associated with the input is transmitted (Step 311). More particularly, when microprocessor 217 receives input from the key sensor 207 due to activation of one of the keys 203 by the user, the microprocessor directs the transceiver 211 to send data associated with the activation to the computer 100. Because the receipt of input from the key sensor 207 indicates user interaction with the keyboard 101, the counter (from Step 307) is reset to begin the period of inactivity. If input is received from the presence sensor 213 (Step 313), the counter (from Step.307) is again reset to begin the period of inactivity. Accordingly, either input from the key sensor 207 or the presence sensor 213 resets the counter. In some configurations of the keyboard 101, only input from the presence sensor 213 will reset the counter.

If input is not received from the key sensor 207 or the presence sensor 213, then the microprocessor 217 determines whether the counter has reached zero (Step 315). In circumstances where the counter has not reached zero, the microprocessor continues to seek input from the key sensor 207 or the presence sensor 213. If, however, the counter has reached zero, the microprocessor 217 disables the wireless connection by reducing power to the transceiver 211 and also disables the light source 209 (Step 317). More particularly, the keyboard 101 converts from the high power state to the low power state. In effect, therefore, when the period of inactivity expires, the keyboard 101 converts from the high power state to the low power state to conserve energy in the power source 215.

When in the low power state, the microprocessor continues to seek input from the key sensor 207 or the presence sensor 213 (Step 319). If no input is received, the keyboard 101 remains in the low power state. If input is received, however, from either of the key sensor 207 or the presence sensor 213, then the microprocessor 217 enables the wireless connection, illuminates the light source 209, sets the counter, and the process continues as discussed above.

Based upon the above discussion, the keyboard 101 remains in the high power state until a period of inactivity expires. Following the period of inactivity, the keyboard 101 converts to the low power state until input is received from either of the key sensor 207 or the presence sensor 213. If no input is received, the keyboard 101 remains in the low power state. When input is received, the keyboard 101 converts back to the high power state so that activations of the various keys 203 result in data being transmitted to the computer 100.

Increasing Illumination

A time delay occurs between the time when the microprocessor 217 directs the transceiver 211 to establish a connection with the computer 100 and the time when the connection is fully established. If the user activates keys 203 during this time delay, characters or functions associated with the activations may not be immediately transmitted to the computer 100, which results in undesirable latency. In order to provide the user with feedback on whether the connection has been established, the illumination from the light sources 209 may be gradually increased during the time delay so that full illumination of the light sources 209 coincides with establishment of the connection. Accordingly, the user will learn to wait until the light sources 209 have reached full illumination prior to activating the keys 203. Given that the presence sensor 213 detects the presence of the user prior to physical contact between the user and the keyboard 101, light sources 209 may begin to illuminate before physical contact is made.

The time delay may range from fractions of a second to multiple seconds, depending upon various factors. In order to effectively time the gradual increase in illumination of light sources 209, the delay may be predetermined based upon averages for various systems or the keyboard 101 may calculate the time delay, for example. Once the delay is determined and presence of the user proximal the keyboard 101 is detected, the intensity of the light source 209 may be increased during a time period substantially equal to the time delay. As noted above, the increasing illumination provides the user with feedback on whether the connection has been established.

Additional States

The keyboard 101 is discussed above as having the high power state and the low power state. Other configurations of the keyboard 101 may have an intermediate state wherein the light sources 209 are deactivated, but the transmitter remains activated. For example, if no input is received from the key sensor 207 or the presence sensor 213, the keyboard 101 converts to the intermediate power state wherein the light sources 209 are deactivated to conserve energy that would be utilized to illuminate the power sources 209. In the intermediate power state, the transceiver 211 remains activated and the connection with the computer 100 remains. After a further delay, however, the transceiver 211 is deactivated. That is, if no input is received from the key sensor 207 or the presence sensor 213 after a further delay, then the keyboard 101 may convert to the low power state.

Figure 7:
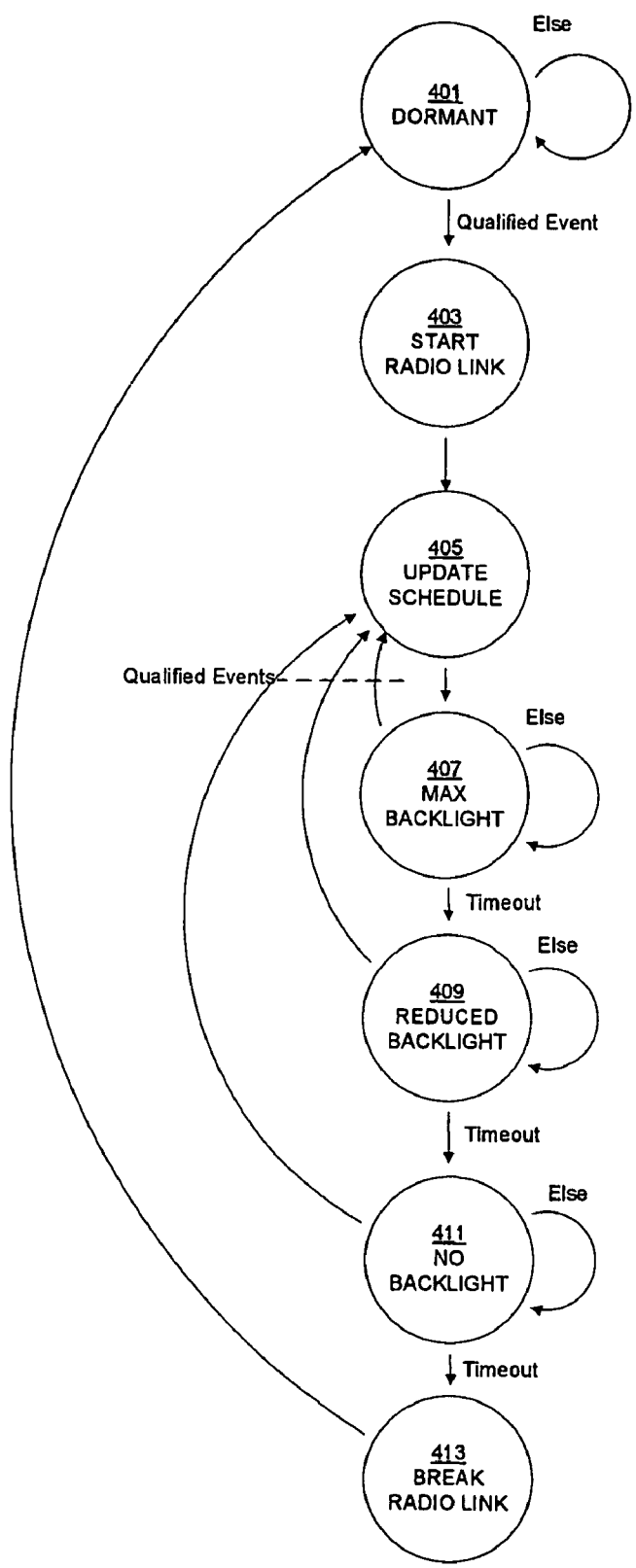
FIG. 7 is a state diagram illustrating operation of the keyboard or another input device.

With reference to FIG. 7, a state diagram illustrating various additional states for the keyboard 101 is depicted. In each of the states, various degrees of power are utilized. A dormant state 401 is substantially similar to the low power state discussed above. In the dormant state 401, the light sources 209 and the transceiver 211 are in low power operation, and the key sensors 207 may also be in low power operation. The dormant state 401 may have multiple sub-states where the level of activity (and power consumption) may increase temporarily. For example when an initial change in the presence sensor 213 is observed, the sample rate may increase in order to provide a better discrimination of true user presence and background noise. Input from the presence sensor 213 indicating user presence may be qualified by the number of times that the presence sensor 213 has detected user presence (from a user absent state) without having the user actually use the keyboard 101. For example, if more than three detections of user presence have occurred without the user actually using the keyboard 101, the presence event may be ignored. This would assist in the event that the presence sensor 213 indicates false presence due to noise in the environment. Other events that would qualify for exiting of the dormant state 401 include input from key sensor 207 or other positive interaction with the keyboard 101.

Once input from the key sensor 207 or the presence sensor 213 is received, the keyboard 101 enters a start radio link state 403. In this state, the wireless connection with the computer 100 is established. Start radio link state 403 corresponds, therefore, with step 303 discussed above.

Following the start radio link state 403, the keyboard 101 may enter an update schedule state 405, in which intervals for activation of the key sensor 207, the light sources 209, and the transceiver 211 are established. That is, the time periods during which the key sensor 207, the light sources 209, and the transceiver 211 remain active are determined and may be reflected in step 307 of the flow diagram. The time periods may depend on what types of events have been detected (i.e., user presence, key or button press or release, other sensors) as well as the status of the wireless connection, whether a cable connection is utilized to connect the keyboard 101 to the computer 100, or the state of the power source 215 (i.e., is it being charged or running on batteries). The time periods may be updated on the occurrence of appropriately qualified events that include user interactions with the keys 203, input from the key sensor 207 and the presence sensor 213, user presence or absence changes, changes in the power source 215, or changes in the wireless connection state.

The degree to which the keys 203 are illuminated by the light sources 209 depends upon whether the keyboard 101 is in a max backlight state 407, a reduced backlight state 409, or a no backlight state 411. Following positive interaction between the user and the keyboard 101, for example, the keyboard 101 may convert to the max backlight state 407 to provide maximum illumination for the keys 203. After an interval of inactivity, the keyboard 101 may convert to the reduced backlight state 409, wherein the keys 203 are illuminated to a lesser degree. After a longer period of inactivity, the keyboard 101 may convert to the no backlight state 411. The time periods for each of states 407, 409, and 411 may be determined during the update schedule state 405 based upon the various events discussed therein.

The time period during which the transceiver 211 retains the wireless connection with the computer 100 may also be determined during the update schedule state 405 based upon the various events discussed therein. Following a period of inactivity, the keyboard 101 may enter a break radio link state 413, which effectively returns the keyboard 101 to the dormant state 401. That is, after a sufficient period of inactivity, the keyboard 101 enters the low power state, wherein energy is conserved.

Pointing Device Configurations

Figure 8:
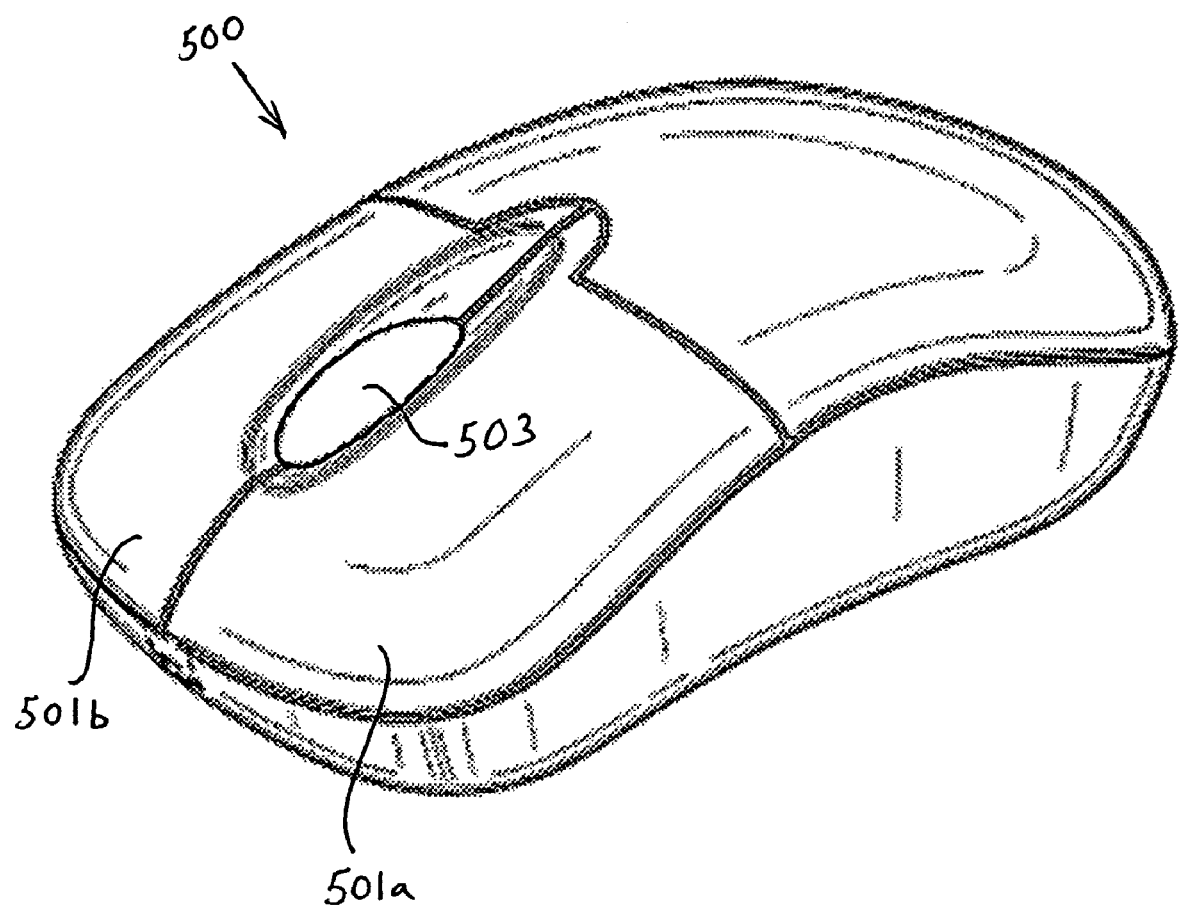
FIG. 8 is a perspective view of a pointing device.

With reference to FIG. 8, a pointing device 500 having the configuration of a mouse is depicted. The pointing device 500 includes a primary key 501*a* and a secondary key 501*b* that are located on opposite sides of a scroll wheel 503. In addition, a conventional tracking assembly (not depicted) that may include a roll ball or optical tracking system is incorporated into the pointing device 500. As with keyboard 101, the pointing device 500 may be a wireless input device that incorporates a presence sensor and a light source. The pointing device 500 may also include a power source that benefits from various power management states. Accordingly, the pointing device 500 may have a high power state wherein the wireless connection and the light sources are activated, and the pointing device 500 may have a low power state wherein the wireless connection and the light sources are deactivated. In addition to a mouse, a trackball pointing device may include similar features.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

What is claimed is:

1. A method comprising steps of:
   determining a time delay for establishing a data connection between a wireless input device and a computer;
   detecting, utilizing a presence sensor associated with the wireless input device, a presence proximal the wireless input device from a user absent state, wherein the data connection between the wireless input device and the computer is in a disabled state prior to detecting the presence of a user proximal to the wireless input device, wherein the disabled state comprises a dormant power state, the dormant power state comprising a first state in an ordered plurality of power states, wherein each of the ordered plurality of power states utilizes various degrees of power, wherein the ordered plurality of power states comprises the dormant state, a start radio link state, an update schedule state, a max backlight state, a reduced backlight state, a no backlight state and a break radio link state, wherein the dormant state comprises a plurality of dormant sub-states wherein a level of activity and power consumption for the wireless input device temporarily increases, without exiting the dormant power state, wherein the plurality of dormant sub-states comprises a first dormant sub-state, wherein in the first dormant sub-state, upon detecting an initial change in the presence sensor, a sample rate of the presence sensor is increased to determine whether the initial change in the presence sensor is background noise in an environment comprising the wireless input device and, if so, remaining in the dormant power state;
   upon detecting a positive interaction with the wireless input device:
     exiting the dormant state to enter subsequent states in the ordered plurality of power states; and
     gradually increasing an intensity of a light source, the gradual increase in the intensity providing feedback indicating a current status of the data connection during a time period substantially equal to the time delay for establishing the data connection between the wireless input device and the computer, wherein a full illumination of the light source coincides with a full establishment of the data connection between the wireless input device and the computer from the disabled state, wherein the time delay for establishing the data connection between the wireless input device and the computer is predetermined based upon a plurality of time delay averages for establishing a data connection, from the disabled state, with various computer systems.

2. The method recited in claim 1, wherein the step of detecting a presence proximal the wireless input device from a user absent state includes utilizing portions of the sensor positioned adjacent edges of the wireless input device.

3. The method recited in claim 1, wherein the step of detecting a presence proximal the wireless input device from a user absent state includes utilizing a capacitive sensor.

4. The method recited in claim 1, further including a step of configuring the light source to illuminate controls of the wireless input device.

5. The method recited in claim 1, further including a step of configuring the wireless input device to be a keyboard.

6. A method of managing a power state between a wireless input device and a computer, comprising:
   determining a time delay for establishing a data connection between a wireless input device and a computer;
   detecting, utilizing a presence sensor associated with the wireless input device, a presence proximal the wireless input device from a user absent state, wherein the data connection between the wireless input device and the computer is in a disabled state prior to detecting the presence of a user proximal to the wireless input device, wherein the disabled state comprises a dormant power state, the dormant power state comprising a first state in an ordered plurality of power states, wherein each of the ordered plurality of power states utilizes various degrees of power, wherein the ordered plurality of power states comprises the dormant state, a start radio link state, an update schedule state, a max backlight state, a no backlight state and a break radio link state, wherein the dormant state comprises a plurality of dormant sub-states wherein a level of activity and power consumption for the wireless input device temporarily increases, without exiting the dormant power state, wherein the plurality of dormant sub-states comprises a first dormant sub-state, wherein in the first dormant sub-state, upon detecting an initial change in the presence sensor, a sample rate of the presence sensor is increased to determine whether the initial change in the presence sensor is background noise in an environment comprising the wireless input device and, if so, remaining in the dormant power state; and
   upon detecting a positive interaction with the wireless input device
   exiting the dormant state to enter subsequent states in the ordered plurality of power states; and
   gradually increasing an intensity of a light source to indicate a current status of the data connection during the time delay for establishing the data connection between the wireless input device and the computer.

7. The method recited in claim 6, wherein the step of detecting a presence proximal the wireless input device from a user absent state includes utilizing portions of the sensor positioned adjacent edges of the wireless input device.

8. The method recited in claim 6, wherein the step of detecting a presence proximal the wireless input device from a user absent state, includes utilizing a capacitive sensor.

9. The method recited in claim 6, further including a step of configuring the light source to illuminate controls of the wireless input device.

10. The method recited in claim 6, further including a step of configuring the wireless input device to be a keyboard.

11. The method of claim 6, wherein the time delay for establishing the data connection between the wireless input device and the computer is predetermined based upon a plurality of time delay averages for establishing a data connection, from the disabled state, with various computer systems.

12. The method of claim 1, further comprising ignoring the presence proximal the wireless input device from the user absent state when a threshold comprising a plurality of user presence occurrences is exceeded, wherein each of the plurality of user presence occurrences do not include a positive interaction with the wireless input device.

13. The method of claim 6, further comprising ignoring the presence proximal the wireless input device from the user absent state when a threshold comprising a plurality of user presence occurrences is exceeded, wherein each of the plurality of user presence occurrences do not include a positive interaction with the wireless input device.

* * * * *